United States Patent
Marocchini et al.

(10) Patent No.: US 9,732,864 B2
(45) Date of Patent: Aug. 15, 2017

(54) CONTAMINATION RESISTANT CARTRIDGE VALVE

(71) Applicant: Hamilton Sundstrand Corporation, Charlotte, NC (US)

(72) Inventors: Francis P. Marocchini, Somers, CT (US); Aaron F. Rickis, Feeding Hills, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 471 days.

(21) Appl. No.: 14/277,478

(22) Filed: May 14, 2014

(65) Prior Publication Data

US 2015/0330521 A1    Nov. 19, 2015

(51) Int. Cl.
- *F16K 11/07* (2006.01)
- *F16K 27/04* (2006.01)
- *F16K 15/06* (2006.01)

(52) U.S. Cl.
CPC ........ *F16K 11/0712* (2013.01); *F16K 15/063* (2013.01); *F16K 27/041* (2013.01); *Y10T 137/8122* (2015.04); *Y10T 137/86767* (2015.04)

(58) Field of Classification Search
CPC .......... F04B 49/03; F04B 49/22; F04B 53/10; F04B 39/10; F04C 15/064; F04C 15/066; F04C 15/068; F04C 29/124; F04C 29/126; F04C 29/128; F16K 11/0712; F16K 15/063; F16K 27/041; Y10T 137/786; Y10T 137/7856; Y10T 137/7864; Y10T 137/7925; Y10T 137/7934;

(Continued)

(56) References Cited

U.S. PATENT DOCUMENTS

| | | | | |
|---|---|---|---|---|
| 2,918,083 A | * | 12/1959 | Clark, Jr. | F16K 15/026 137/515.5 |
| 3,057,374 A | * | 10/1962 | Gondek | F16K 17/0433 137/538 |
| 3,074,428 A | * | 1/1963 | Mancewicz | F16K 17/0433 137/514 |

(Continued)

FOREIGN PATENT DOCUMENTS

| | | |
|---|---|---|
| DE | 2609406 A1 | 9/1977 |
| DE | 3723672 A1 | 1/1989 |

OTHER PUBLICATIONS

European Search Report for application No. EP15167773.9; Mailing Date Oct. 21, 2015, 7 pages.

*Primary Examiner* — Craig Schneider
*Assistant Examiner* — Frederick D Soski
(74) *Attorney, Agent, or Firm* — Cantor Colburn LLP

(57) ABSTRACT

In one aspect, a pressure regulating valve assembly is provided. The valve assembly includes a housing having a fluid inlet and a fluid outlet, a sleeve positioned within the housing, and a spool at least partially positioned within the sleeve. The spool includes an outer surface having a shoulder, and the spool is configured to translate within the sleeve between a closed position and an open position. The valve assembly further includes a cap coupled to the sleeve and surrounding at least a portion of the spool, and the cap includes an inner surface with a flange extending therefrom. In the closed position the spool shoulder abuts against the cap flange to define a sealed metering edge. In the open position the spool shoulder is spaced from the cap flange to unseal the metering edge and define a metering window to facilitate fluid flow therethrough to the fluid outlet.

4 Claims, 3 Drawing Sheets

(58) Field of Classification Search
CPC ......... Y10T 137/7939; Y10T 137/7904; Y10T 137/7922; Y10T 137/7929; Y10T 137/7937; Y10T 137/7932; Y10T 137/7933; Y10T 137/2559; Y10T 137/2562; Y10T 137/2663; Y10T 137/2605; Y10T 137/265; Y10T 137/2652; Y10T 137/2693; Y10T 137/8122; Y10T 137/86767; Y10T 137/86734; Y10T 137/86775; Y10T 137/86791; Y10T 137/86799
USPC .......................... 417/307, 308, 309, 559, 279
See application file for complete search history.

(56) References Cited

U.S. PATENT DOCUMENTS

| | | | | |
|---|---|---|---|---|
| 3,319,423 A * | 5/1967 | Caraher | ............... | B63G 8/36 137/109 |
| 3,339,574 A * | 9/1967 | Erb | ............... | F02C 7/232 137/102 |
| 3,547,559 A * | 12/1970 | Tittmann | ............... | F15B 13/02 417/279 |
| 3,952,510 A * | 4/1976 | Peterson | ............... | E02F 9/2221 180/406 |
| 4,294,278 A * | 10/1981 | Blake | ............... | F16D 25/14 137/115.26 |
| 4,305,566 A * | 12/1981 | Grawunde | ............... | F16K 31/406 137/491 |
| 4,699,171 A * | 10/1987 | Sugden | ............... | F16K 17/0473 137/468 |
| 4,742,846 A * | 5/1988 | DiBartolo | ............... | F16K 17/065 137/469 |
| 4,876,857 A * | 10/1989 | Feltz | ............... | F02C 9/263 137/516.29 |
| 5,699,859 A * | 12/1997 | Poirier | ............... | F04B 47/06 137/315.33 |
| 6,994,406 B1 * | 2/2006 | Krawczyk | ............... | B60T 8/363 251/129.02 |
| 7,322,373 B2 * | 1/2008 | Lewis | ............... | F02C 9/263 137/516.29 |
| 2005/0097880 A1 * | 5/2005 | Jansen | ............... | F01D 25/12 60/39.281 |
| 2010/0078085 A1 * | 4/2010 | Kurokawa | ............... | F16K 17/0473 137/528 |
| 2014/0119956 A1 * | 5/2014 | Ballard | ............... | F04C 14/26 417/307 |

\* cited by examiner

CONTAMINATION RESISTANT CARTRIDGE VALVE

BACKGROUND OF THE INVENTION

This disclosure generally relates to valves, and more particularly, to contaminant resistant pressure regulating valves.

Some known valves incorporate matched diameter components with metering edges to resist buildup of contaminants that may be present in fluid passed through the valves. However, pressure and fluid flow forces may drive contaminants into clearances between the matched diameter components. Over time, such contaminants may accumulate in these sensitive clearances, which may bind the valves in the open or closed position, for example.

When the valves are open and flowing, the contaminants in the fluid stream may be directed into these clearances by fluid momentum and pressure deltas (i.e., pressure differences over a portion of the valves). When the valves are closed, the pressure deltas continue to drive contaminants into clearances such as diametrical clearances between a piston and a sleeve. In addition, the valves may include a metering edge that includes non-flowing areas, which may allow contaminants to remain in those non-flowing areas and build up over time. Accordingly, it is desirable to provide a self-cleaning, contamination resistant valve.

BRIEF DESCRIPTION OF THE INVENTION

In one aspect, a pressure regulating valve assembly is provided. The valve assembly includes a housing having a fluid inlet and a fluid outlet, a sleeve positioned within the housing, and a spool at least partially positioned within the sleeve. The spool includes an outer surface having a shoulder, and the spool is configured to translate within the sleeve between a closed position and an open position. The valve assembly further includes a cap coupled to the sleeve and surrounding at least a portion of the spool, and the cap includes an inner surface with a flange extending therefrom. In the closed position the spool shoulder abuts against the cap flange to define a sealed metering edge. In the open position the spool shoulder is spaced from the cap flange to unseal the metering edge and define a metering window to facilitate fluid flow therethrough to the fluid outlet.

In another aspect, a pressure regulating valve assembly is provided. The valve assembly includes a housing having a fluid inlet, a first fluid outlet, and a second fluid outlet, a sleeve positioned within the housing, the sleeve including a window formed therethrough, and a spool at least partially positioned within the sleeve. The spool includes a downstream end and an upstream end, the upstream end including an outer surface having a shoulder, and the downstream end having an axially extending fluid channel and at least one fluid outlet formed therein. The spool is configured to translate within the sleeve between a closed position and an open position. The valve assembly further includes a cap coupled to the sleeve and surrounding at least a portion of the spool, the cap having an inner surface with a flange extending therefrom. The spool shoulder is configured to abut against the cap flange to define a sealed metering edge.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Described herein is a pressure regulating valve having self-cleaning, contaminant resistant features. The valve includes a cap and a translating spool. In a closed position, the spool abuts against the cap to create a sealed metering edge. In an open position, a 360° metering edge or window is defined between the spool and the cap and facilitates preventing contaminates from being trapped proximate the metering edge. A downstream intermediate area between the spool and the cap and an outlet window formed in the cap are each formed larger than an inlet window formed in the spool. The larger downstream intermediate area and outlet window create a zero pressure restriction that facilitates preventing contaminant buildup between the spool and other valve components.

Figure 1:
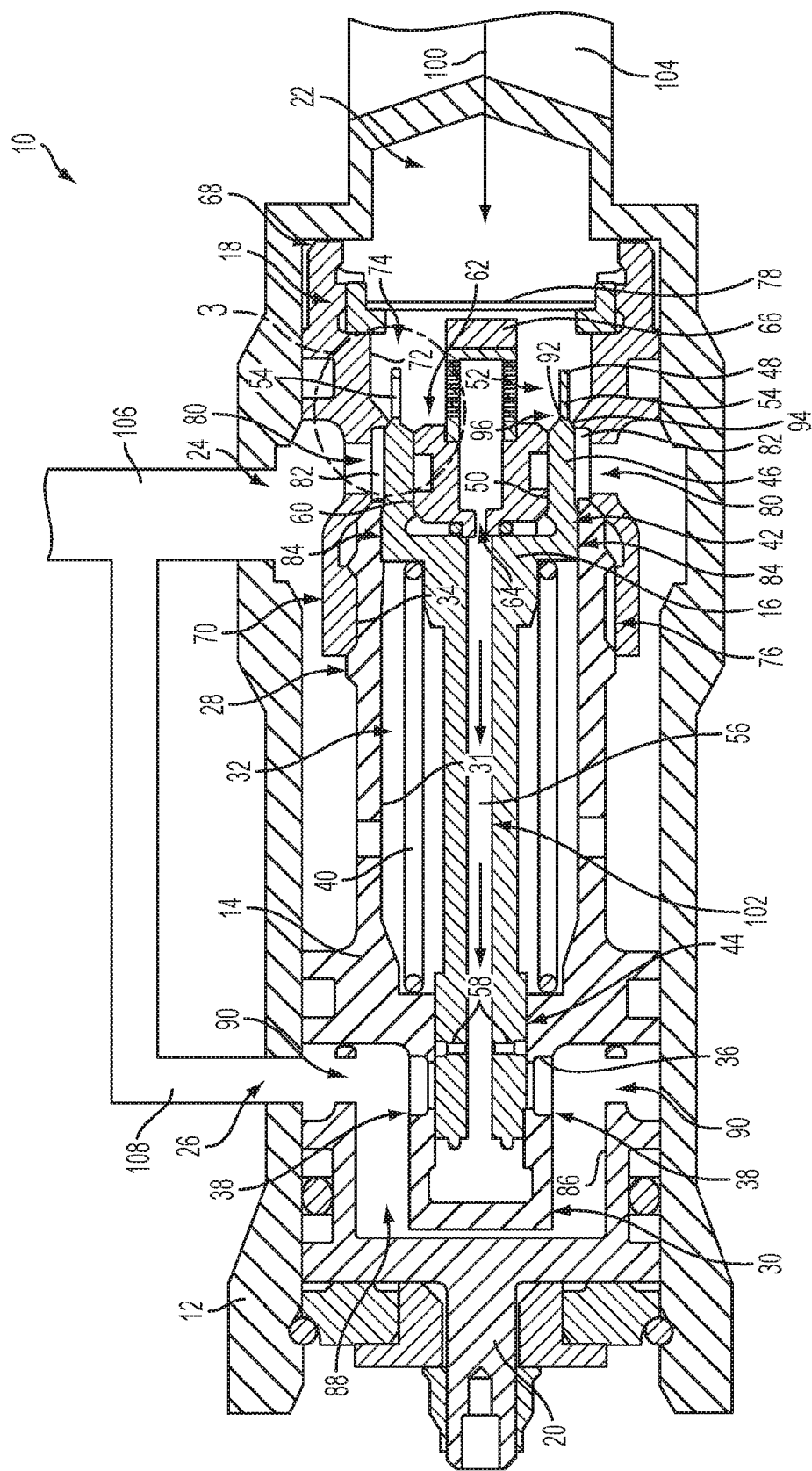
FIG. 1 is a cross-sectional view of a valve assembly in a closed position.
Figure 2:
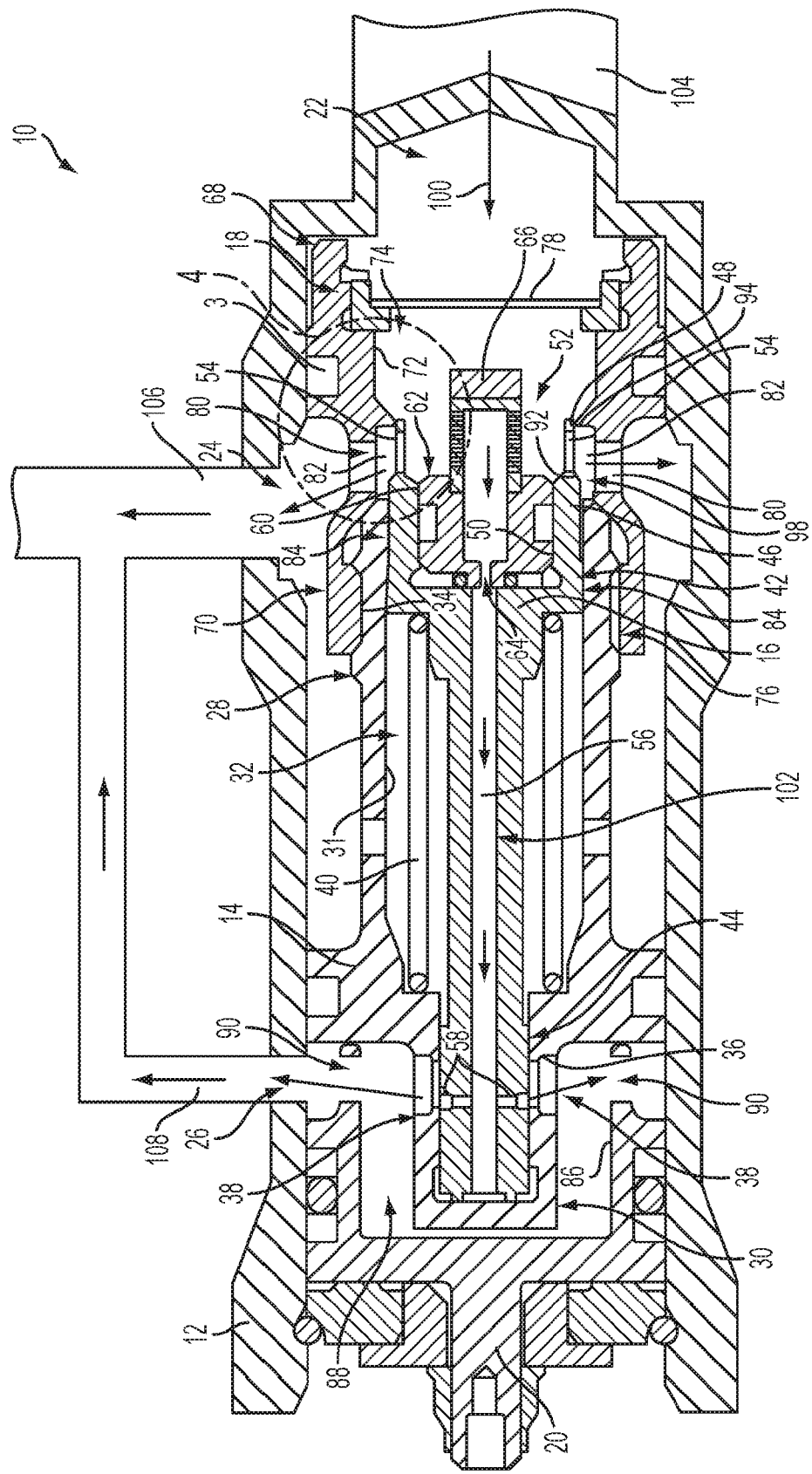
FIG. 2 is a cross-sectional view of the valve assembly shown in FIG. 1 in an open position.

FIGS. 1 and 2 illustrate a cartridge or valve assembly 10 that generally includes a housing 12, a sleeve 14, a spool 16, a cap 18, and a closure 20. FIG. 1 illustrates valve assembly 10 in a closed position, and FIG. 2 illustrates valve assembly 10 in an open position.

Housing 12 includes a fluid inlet 22, a main fluid outlet 24, and a secondary fluid outlet 26. A fluid 100 flows from fluid inlet 22 to fluid outlets 24, 26, as is described herein in more detail. Fluid inlet 22, main fluid outlet 24, and secondary outlet 26 are each configured to be coupled to plumbing (104, 106, 108) of a pressure regulated system (e.g., a dual vane fuel pump). In one embodiment, assembly 10 is a self-contained cartridge that may be inserted directly into the pressure regulated system (not shown).

Sleeve 14 is positioned within housing 12 and includes a first end 28, a second end 30, and an inner wall 31 defining a spool cavity 32. First end 28 includes a threaded outer surface 34, and second end 30 includes a window 36 formed therein. Window 36 defines a downstream variable restrictor 38 to restrict fluid flow to secondary fluid outlet 26.

Spool 16 is movably positioned within sleeve spool cavity 32 such that spool 16 translates between the closed position (FIG. 1) and the open position (FIG. 2). Spool 16 is biased in the closed position by a biasing mechanism 40 (e.g., a spring). Spool 16 includes a large piston or upstream end 42 and a small piston or downstream end 44. Upstream end 42 includes a cylindrical wall 46 and a cylindrical wall 48 extending therefrom. Cylindrical wall 46 defines a bore 50 therein, and cylindrical wall 48 defines an inlet area 52 therein to receive fluid flow 100 from housing inlet 22. Cylindrical wall 48 includes inlet windows 54 formed therethrough to facilitate supplying fluid 100 to housing main fluid outlet 24 when valve assembly 10 is in the open position.

Spool downstream end 44 includes an axially extending fluid channel 56 that extends between bore 50 and fluid outlets 58 formed in downstream end 44. Fluid outlets 58 are fluidly coupled to downstream variable restrictor 38 when valve assembly 10 is in the open position, and fluid is prevented from entering restrictor 38 via fluid outlets 58 when valve assembly 10 is in the closed position.

A fixed orifice 60 is oriented within spool bore 50 and includes an inlet end 62 and a restrictor outlet end 64 fluidly coupled to fluid channel 56. A screen or fine filter 66 is coupled to fixed orifice inlet end 62 to facilitate filtering particulates or contaminants out of fluid flow 100 passing therethrough from spool inlet area 52.

Cap 18 is generally cylindrical and includes a first end 68, a second end 70, and an inner wall 72 defining an aperture 74. Inner wall 72 includes a threaded portion 76 on second end 70 such that second end 70 is coupled to sleeve 14 by threading onto sleeve threaded surface 34. However, cap 18 may be coupled to sleeve 14 by any suitable fastening or coupling method (e.g., via welding). Cap first end 68 may include a screen or coarse filter 78 to facilitate filtering particulates or contaminants out of fluid flow 100 passing therethrough from housing fluid inlet 22 to spool inlet area 52.

Cap 18 includes outlet windows 80 formed therethrough to fluidly couple spool inlet area 52 and housing main fluid outlet 24 when valve assembly 10 is in the open position. When cap 18 is coupled to sleeve 14, an intermediate cavity 82 is defined between cylindrical wall 48 and cap inner wall 72. Intermediate cavity 82 receives fluid 100 flowing through spool inlet windows 54.

Cap outlet windows 80 and/or intermediate cavity 82 each have an area and/or volume that is larger than the respective area and/or volume of spool inlet windows 54 to create a low pressure area downstream of spool inlet windows 54. The low pressure area facilitates supplying fluid flow 100 directly to housing main fluid outlet 24 through inlet windows 54, intermediate cavity 82, and cap outlet windows 80, and facilitates preventing fluid flow 100 from entering a clearance 84 defined between spool 16 and sleeve inner wall 31. As such, contaminants contained in fluid 100 are prevented from being deposited within clearance 84.

Closure 20 is positioned within housing 12 and includes an inner wall 86 defining a bore 88 that receives a portion of sleeve 14. Closure 20 also includes outlet windows 90 formed therethrough to enable fluid 100 to flow from spool fluid outlets 58, through downstream variable restrictor 38, and to housing secondary fluid outlet 26.

In one embodiment, valve assembly 10 includes a fluid modulating circuit 102, which is defined by and includes serial flow through filter 66, fixed orifice 60, spool fluid channel 56, spool fluid outlets 58, downstream variable restrictor 38, closure outlet windows 90, and housing secondary fluid outlet 26, as is described herein in more detail.

Figure 3:
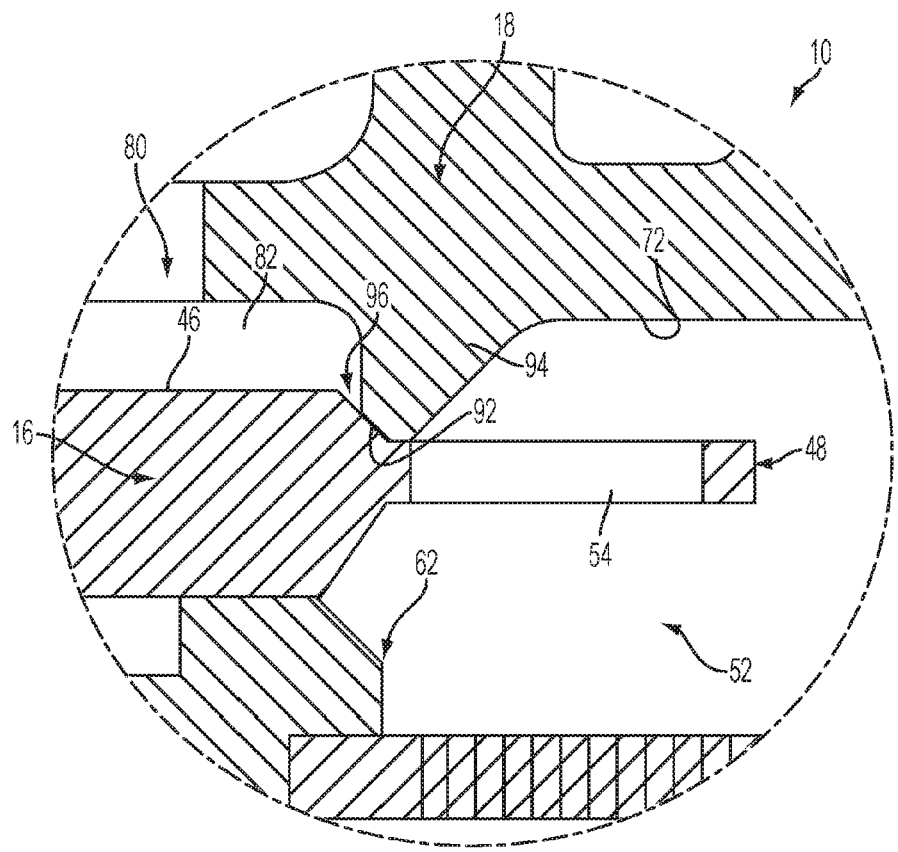
FIG. 3 is an enlarged view of the valve assembly shown in FIG. 1 and taken on section 3.
Figure 4:
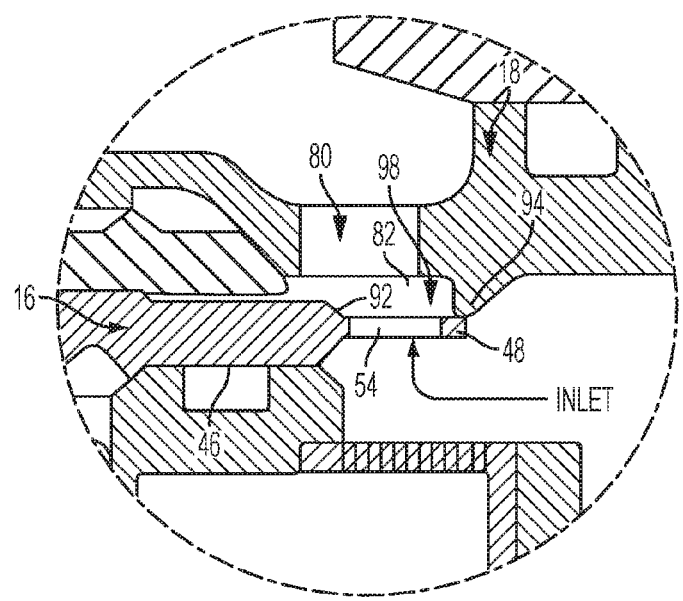
FIG. 4 is an enlarged view of the valve assembly shown in FIG. 2 and taken on section 4.

FIGS. 3 and 4 illustrate relative positioning between spool 16 and cap 18 in the open and closed positions of valve assembly 10. FIG. 3 illustrates valve assembly 10 in the closed position, and FIG. 4 illustrates valve assembly 10 in the open position. As shown in more detail, cylindrical wall 46 includes a spool shoulder portion 92 and cap inner wall 72 includes a flange 94.

In the closed position (FIG. 3), spool shoulder portion 92 abuts against flange 94 to create a seal, referred to as a metering edge 96, which facilitates preventing flow of fluid 100 to housing main fluid outlet 24. In the exemplary embodiment, spool 16 and cap 18 are fabricated from metal such that there is a metal-to-metal contact seal formed therebetween. However, spool 16 and cap 18 may be fabricated from any suitable material that enables valve assembly 10 to function as described herein.

In the open position (FIG. 4), spool shoulder portion 92 and flange 94 are separated to create a clearance or metering window 98 therebetween to facilitate flow of fluid 100 through spool inlet windows 54 to housing main fluid outlet 24. In the illustrated embodiment, metering window 98 facilitates eliminating non-flowing areas that may trap contaminants proximate the metering edge 96.

In operation, fluid 100 flows from an inlet conduit 104, through housing fluid inlet 22, and passes through filter 78 where relatively large contaminants or particles contained in fluid 100 are separated therefrom. Fluid 100 subsequently flows into spool inlet area 54.

With valve assembly 10 in the closed position (FIGS. 1 and 3), spool shoulder portion 92 is seated against flange 94 such that metering edge 96 is sealed and facilitates preventing fluid flow 100 into intermediate cavity 82 and thus housing main fluid outlet 24. Fluid 100 may flow into spool fluid channel 56 of modulating circuit 102 via filter 66 and fixed orifice 60. However, in the closed position, spool fluid outlets 58 abut against sleeve inner wall 31, thereby facilitating preventing fluid 100 from flowing into downstream variable restrictor 38 and thus housing secondary fluid outlet 26.

Valve assembly 10 is moved to the open position (FIGS. 2 and 4) when the fluid pressure on spool 16 exceeds the designed biasing force of biasing mechanism 40. As such, spool 16 is translated within sleeve 14 toward closure 20 and into the open position. During the translation of spool 16, spool shoulder portion 92 is separated from flange 94, which unseals metering edge 96 and forms the metering window 98 between spool 16 and cap 18. With metering edge 96 unsealed, fluid 100 freely flows into intermediate cavity 82 while removing or self-cleaning any contaminates that have built up on spool 16 and/or cap 18 near metering edge 96. Fluid 100 subsequently flows through cap outlet windows 80 to housing main fluid outlet 24 and into a main outlet conduit 106 coupled to housing 12.

Because intermediate cavity 82 and outlet windows 80 have a larger area and/or volume than spool inlet windows 54, the resulting lower pressure of the larger area and/or volume directs fluid 100 to main fluid outlet 24 rather than into clearance 84. Accordingly, the pressure on both sides of spool upstream end 42 is directed to the same pressure source to minimize any delta pressure across the interface between the inner diameter of sleeve first end 28 and the outer diameter of spool 16, which facilitates preventing fluid 100 and any contaminants flowing into sensitive clearance 84 by pressure deltas.

In addition to flow through metering window 98, fluid 100 may be directed through modulating circuit 102 when valve assembly 10 is in the open position. As such, a portion of fluid 100 flows through fine filter 66 where relatively fine contaminants or particles contained in fluid 100 are separated therefrom. Fluid 100 subsequently flows through restrictor 64 of fixed orifice 60 and into fluid channel 56. Due to translation of spool 16, fluid outlets 58 are now fluidly coupled to downstream variable restrictor 38. Higher pressure fluid 100 then flows to restrictor 38 while removing or self-cleaning any contaminants that have built up in the fluid interface between spool end 44 and sleeve end 30 and/or between spool downstream end cavity 32 and fluid outlet 58. Fluid 100 subsequently flows through closure outlet windows 90 to housing secondary fluid outlet 26 and into a secondary outlet conduit 108 coupled to housing 12. Conduit 108 may then be fluidly coupled to main outlet conduit 106.

As such, modulating circuit 102 modulates pressure in valve assembly 10 as valve assembly 10 moves to the open position. Circuit 102 modulates the pressure of fluid 100 flowing therethrough to vary the force balance across spool 16. This, in turn, controls the pressure drop across valve assembly 10. As valve assembly 10 moves more to the full-open position, the window size defined between downstream variable restrictor 38 and fluid outlets 58 increases, and the larger window opening results in a decreased pressure drop across valve assembly 10. Alternatively, valve assembly 10 may not include modulating circuit 102.

A method of assembling valve cartridge assembly 10 includes providing housing 12 having sleeve 14, and providing spool 16. Fixed orifice 60 and filter 66 are threaded into spool bore 50, and biasing mechanism 40 and spool 16 are subsequently assembled into sleeve 14. Cap 18 is threaded onto spool 16. Cartridge 10 may then be calibrated as a sub-assembly. Once the desired performance is achieved, cartridge 10 may be assembled into a main assembly (not shown) for use.

Described herein are systems and methods for preventing or reducing fluid contaminant buildup in pressure regulator valves. The valve assembly includes a metering edge between a spool and cap that is sealed when the valve assembly is in the closed position and defines a 360° metering window when the valve assembly is in the open position. A relatively large cavity and cap outlet window downstream of a spool inlet window prevents fluid flow into sensitive clearances between the spool and other components. Accordingly, the metering edge reduces or prevents fluid contaminant buildup in the closed position and self-cleans buildup near the metering edge when the valve assembly is open.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A pressure regulating valve assembly comprising:
a housing having a fluid inlet, a first fluid outlet, and a second fluid outlet;
a sleeve positioned within the housing, the sleeve including a window that defines a downstream variable restrictor;
a spool at least partially positioned within the sleeve, the spool including a downstream end and an upstream end, the upstream end including an outer surface having a spool shoulder portion, and the downstream end having an axially extending fluid channel and at least one fluid outlet that is fluidly coupled to the downstream variable restrictor formed therein, wherein the spool is configured to translate within the sleeve between a closed position and an open position; and
a cap coupled to the sleeve and surrounding at least a portion of the spool, the cap having an inner surface with a flange extending therefrom, wherein the spool shoulder portion is configured to abut against the flange to define a metering edge.

2. The valve assembly of claim 1, wherein the spool upstream end includes a first cylindrical wall and a second cylindrical wall extending from the first cylindrical wall, the first cylindrical wall defining a bore therein and the second cylindrical wall defining a fluid inlet area therein, and wherein the axially extending fluid channel is configured to supply a fluid to the second fluid outlet.

3. The valve assembly of claim 2, further comprising:
a fixed orifice positioned within the bore, the fixed orifice having an inlet end and a restrictor outlet end; and
a particulate filter coupled to the inlet end of the fixed orifice.

4. A pressure regulating valve assembly comprising:
a housing having a fluid inlet and a fluid outlet;
a sleeve positioned within the housing;
a closure positioned within the housing having an inner wall defining a bore that receives a portion of the sleeve, the closure having an outlet window;
a spool at least partially positioned within the sleeve, the spool including an outer surface having a spool shoulder portion, a cylindrical wall defining a bore therein, at least one fluid outlet, and a fluid channel extending between the bore and the at least one fluid outlet, wherein the spool is configured to translate within the sleeve between a closed position and an open position; and
a cap coupled to the sleeve and surrounding at least a portion of the spool, the cap having an inner surface with a flange extending therefrom,
wherein in the closed position the spool shoulder abuts against the flange to define a sealed metering edge, and wherein in the open position the spool shoulder portion is spaced from the flange to unseal the metering edge and define a metering window to facilitate fluid flow therethrough to the fluid outlet,
wherein the sleeve includes a window configured to fluidly communicate with the at least one spool fluid outlet when the valve assembly is in the open position and prevent fluid communication with the at least one spool fluid outlet when the valve assembly is in the closed position, and
wherein the outlet window is in fluid communication with the at least one fluid outlet through the window.

* * * * *